(12) United States Patent
Posselt

(10) Patent No.: US 6,792,347 B2
(45) Date of Patent: Sep. 14, 2004

(54) ELECTRONIC PROTECTION AGAINST AN EXCHANGE OF EXHAUST-GAS SENSORS IN AN INTERNAL COMBUSTION ENGINE HAVING EXHAUST-GAS AFTERTREATMENT, ESPECIALLY OF A MOTOR VEHICLE

(75) Inventor: Andreas Posselt, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/354,608

(22) Filed: Jan. 30, 2003

(65) Prior Publication Data

US 2003/0163246 A1 Aug. 28, 2003

(30) Foreign Application Priority Data

Jan. 30, 2002 (DE) .......................................... 102 03 728

(51) Int. Cl.[7] .................................................. G06G 7/70
(52) U.S. Cl. ...................... 701/114; 123/688; 73/118.1; 60/276
(58) Field of Search ................................ 701/114, 101, 701/103, 104, 110, 109; 123/688; 73/118.1; 60/276

(56) References Cited

U.S. PATENT DOCUMENTS

| | | | |
|---|---|---|---|
| 5,647,204 A | * | 7/1997 | Atanasyan ................... 60/274 |
| 6,382,014 B1 | * | 5/2002 | Breton ....................... 73/23.31 |
| 6,453,663 B1 | * | 9/2002 | Orzel et al. .................... 60/277 |
| 6,644,020 B2 | * | 11/2003 | Kuenstler et al. ............. 60/286 |

FOREIGN PATENT DOCUMENTS

| | | |
|---|---|---|
| DE | 38 34 711 | 4/1990 |
| DE | 100 26 213 | 11/2001 |
| DE | 100 17 931 | 12/2001 |
| DE | 197 52 965 | 6/2002 |

* cited by examiner

Primary Examiner—Willis R. Wolfe
Assistant Examiner—Johnny H. Hoang
(74) Attorney, Agent, or Firm—Kenyon & Kenyon

(57) ABSTRACT

In a method and a circuit for installation-exchange protection of at least two measuring sensors for detecting physical/chemical variables of an exhaust gas in a system for exhaust-gas aftertreatment in an internal combustion engine, especially of a motor vehicle, voltage signals of the at least two measuring sensors are read in such that the read-in voltage signals are digitized and the digitized voltage values are buffer-stored. The buffer-stored voltage values each are buffer-stored as a copy. The voltage values buffer-stored as a copy are evaluated on the basis of characteristic voltage variables. During the process it is checked whether an exchange of the at least two measuring sensors has occurred and that, as a function of the test result, the buffer-stored voltage values are each buffer-stored as copies in a crosswise manner.

37 Claims, 1 Drawing Sheet

ELECTRONIC PROTECTION AGAINST AN EXCHANGE OF EXHAUST-GAS SENSORS IN AN INTERNAL COMBUSTION ENGINE HAVING EXHAUST-GAS AFTERTREATMENT, ESPECIALLY OF A MOTOR VEHICLE

CROSS-REFERENCE TO RELATED APPLICATIONS

The present application claims priority to Application No. 102 03 728.0, filed in the Federal Republic of Germany on Jan. 30, 2002, which is expressly incorporated herein in its entirety by reference thereto.

FIELD OF THE INVENTION

The present invention relates to systems for exhaust-gas aftertreatment used in internal combustion engines, e.g., of motor vehicles, and relates to a method, a circuit and a control device to protect against an, e.g., inadvertent, installation exchange of exhaust-gas sensors in such a device.

BACKGROUND INFORMATION

Devices for exhaust-gas aftertreatment in motor vehicles are widely conventional. For instance, a lambda control in conjunction with a catalytic converter is currently an effective exhaust-gas treatment method for the spark-ignition engine. In interaction with currently available ignition systems and injection systems, very low exhaust-gas values may be achieved. In most countries, limit values for the engine exhaust gas are even mandated by law.

Especially effective is the use of a three-way catalytic converter, or selective catalytic converter. This type of catalytic converter is able to break down up to more than 98% of hydrocarbons, carbon monoxide and nitrogen provided the engine is operated within a range of approximately 1% around the stoichiometric air-fuel ratio, with lambda=1. In this context, lambda specifies the degree to which the actually present air-fuel mixture deviates from the value lambda=1, which corresponds to a mass ratio of 14.7 kg air to 1 kg of gasoline that is theoretically required for complete combustion, i.e., lambda is the quotient of the supplied air mass and the theoretical air requirement.

As a general principle, lambda control measures the respective exhaust gas and, on the basis of the measuring result, immediately corrects the supplied fuel quantity with the aid of the injection system, for instance. Used as sensors are either so-called lambda voltage-jump sensors (two-step sensors), which have a voltage jump at precisely lambda=1 and in this manner supply a signal that indicates whether the mixture is richer or leaner than lambda=1. In addition, lambda sensors providing a continuous lambda signal in the range of lambda=1 are used, which, as in the case of lambda voltage-jump sensors, indicates whether the mixture is richer or leaner than lambda=1. As conventional, the action of all sensors is based on the principle of a galvanic oxygen-concentration cell including a solid-state electrolyte (mostly zirconium-dioxide).

So-called "divided" catalytic-converter systems, which are made up of a precatalyst (precat) and a main catalyst (main-cat), are often used for the mentioned catalysis. A common construction type is the cat system shown in FIG. 1, which works according to a 3-sensor principle to achieve very strict exhaust-gas limit values. These cat systems include a detection in case the two LSF sensors disposed before and after the main cat have been exchanged. However, while this detection outputs an error message by generating an electronic error bit if sensors have been exchanged in error during installation, it does not allow any interventions to compensate for such an exchange.

Therefore, the described systems for exhaust-gas aftertreatment have the disadvantage that the error message is the sole response to an exchange of the mentioned sensors or their plug connections, the cat system, however, being unable to continue fulfilling its function.

It is an object of the present invention to provide a method, a circuit and a control unit for operating a device for exhaust-gas aftertreatment in an internal combustion engine, especially of a motor vehicle, which may allow a detection of a possible installation exchange of exhaust sensors, while simultaneously permitting a correction of the occurred exchange of these sensors, so that the device for exhaust-gas aftertreatment is able to continue functioning without interruption.

SUMMARY

The above and other beneficial objects of the present invention are achieved by providing a method, a circuit and a control unit as described herein.

The present invention is based on providing an electronic exchange protection, where the control device, if an exchange is detected, implements a switch-over, internally to the control device, among the signals of the exchanged measuring sensors. An exchange bit provided by a diagnostic unit may be used.

The present invention may thus permit a reliable electronic exchange protection in an engine control unit; instead of the cat system reacting with an error message, it continues operating in a fail-safe manner. The exchange detection not only detects an exchange of the two LSF sensors, but also compensates for the exchange, so that the engine control unit and the engine are able to continue operating without interference and interruption in their function. The robustness of the cat control is increased as is the general everyday usefulness and quality of the cat system. Moreover, the present invention may save a mechanical protection against polarity reversal, for instance by terminal coding.

The method according to the present invention may be implemented by a control program loaded into the engine control unit, thus avoiding expensive hardware modifications at the engine control unit or the cat system.

DETAILED DESCRIPTION

Figure 1:
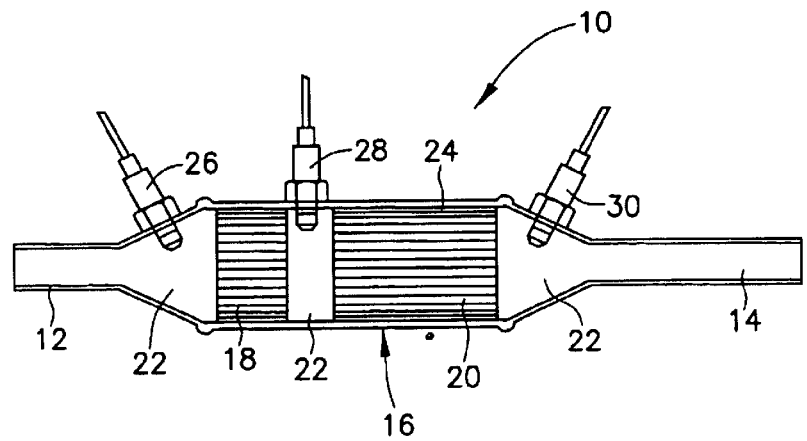
FIG. 1 illustrates a conventional cat system with 3-sensor concept, in a lateral cross-sectional view.

Illustrated in FIG. 1, in a cross-sectional side view, is a conventional "divided" catalytic-converter system (cat system) 10 as it is predominantly used in SULEV (super ultra low emission vehicles) motor vehicles.

Cat system 10 is provided in a generally conventional manner with a catalyst container 16 disposed in the region between an exhaust gas tubular feed component 12 and an exhaust gas tubular discharge component 14, in which a precatalyst (precat) 18 and a main-catalyst (main-cat) 20 are located. In the example embodiment, precat 18 and main-cat 20 are each formed from a monolithic material embedded in a wire-knit mounting 22. Wire-knit mounting 22 is surrounded by a metal housing 24.

The SULEV cat system illustrated in FIG. 1 works according to a 3-sensor concept, that is, a so-called "cascading lambda control", with lambda sensors 26 to 30 disposed upstream from precat 18, downstream from precat 18 and upstream from main-cat 20 and downstream from main-cat 20, respectively. Sensor 26 is a planar broadband (universal) lambda sensor ("LSU" sensor) developed by the Robert Bosch Company, which functions here as a control sensor within a lambda closed-loop control system.

The other two sensors 28, 30, given as type designations "LSF1" and "LSF2", which project into the gap between precat 18 and main-cat 20 or between the existing space behind main-cat 20, are also generally conventional so-called reference sensors, which have the same functional configuration but are assigned different functions within the lambda closed-loop control system. They are used to diagnose the respective upstream catalytic converter or the respective upstream sensor.

Sensors 26 to 30 in the example embodiment, especially LSU sensor 26, are planar two-cell limit current sensors. As is generally conventional, the two most important components of sensors 26 to 30 may be a Nernst oxygen concentration cell and a pump cell carrying oxygen ions. The modular configuration of the sensor, in conjunction with the planar technology, may allow the integration of a plurality of functions. In a conventional manner, sensors 26 to 30 are installed in the exhaust system as exhaust-gas measuring sensors. The pump current of sensors 26 to 30 and the respective actual internal resistance of the sensor are each detected with the aid of an evaluation circuit. These sensors 26 to 30 are individually adjusted. Their measuring accuracy, at the stoichiometric point (lambda=1) as well, is due to the use of a compensating measuring method.

Due to their identical configuration, there is an increased likelihood of a switched installation of the two sensors 28, 30 (LSF1 and LSF2) or an exchange of the respective electrical plug connections. Due to their differing functions, a fatal operating fault will occur in the lambda closed-loop control system if such an exchange has occurred.

It should be noted that catalytic converter system 10, described with the aid of FIG. 1, may also be used in lean-burn engines. In these engines, fuel is injected directly into the combustion chamber and thus better utilized, resulting in lower fuel consumption at a simultaneously slightly increased engine output. However, these directly injecting engines require a more complicated exhaust-gas aftertreatment. In this case, main-cat 20 is implemented as a NOx adsorption catalyst. In such vehicles, the afore-mentioned especially efficient sensor types are, therefore, used for the continuous measurement of the exhaust-gas values. Moreover, the linear sensors assume a relatively complex, integrated circuit in the engine control.

It should also be mentioned that these sensors 26 to 30, apart from being used in lean-burn engines, see increasing use in the already described SULEV vehicles as well. Moreover, possibilities for the use in diesel engines that have been purified of soot particles are already being developed since these sensors may allow a better control of the fuel injection here as well and, in conjunction with additional catalytic converters and sensors, thus make it possible to minimize the NOx emissions.

Figure 2:
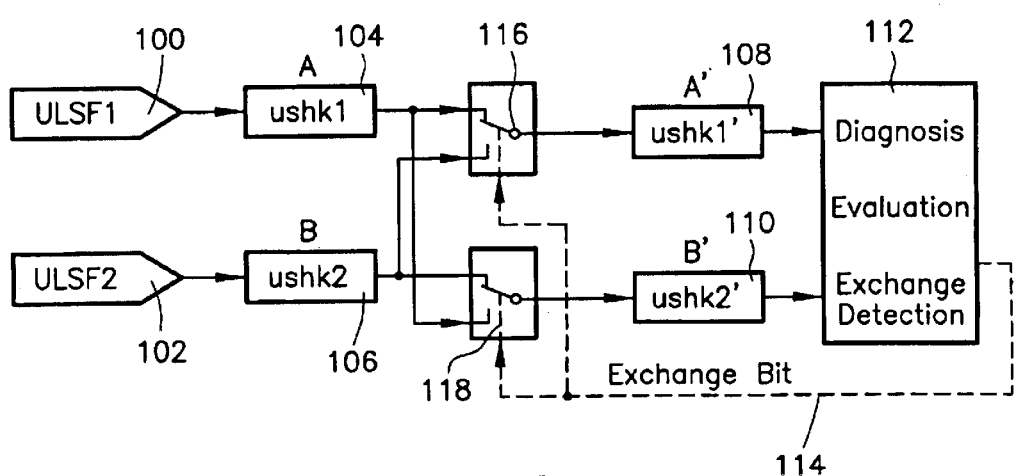
FIG. 2 illustrates an electronic circuit for protection against the installation exchange of exhaust-gas sensors in such a cat system in accordance with the present invention, in the form of a block diagram.

FIG. 2 is a block diagram of an electronic circuit for protection against the installation exchange of the mentioned LSF sensors 28, 30. The circuit includes an arrangement 100, 102 for reading in the respective voltage signals U_LSF1 and U_LSF2 provided by the two LSF sensors 28, 30. The read-in voltage signals may be processed in a conventional manner using an analog/digital transducer, i.e., are scaled and subsequently digitized, if appropriate. The circuit also includes first memory cells 104, 106 (A and B) in which the digitized voltage values are stored as values 'ushk1' and ushk2' and buffer-stored.

Moreover, the circuit includes two additional memory cells 108, 110 (A' and B') in which the contents of memory cells 104, 106 (A and B) are copied as values ushk1' and ushk2', respectively, namely the content of memory cell A to A', and the content of memory cell B to B'.

The circuit includes a diagnostic module 112 to evaluate voltage signals ushk1' and ushk2' stored in memory cells 108, 110 (A' and B'). The evaluation first consists of a plausibility check in which it is detected whether an exchange of the two sensors 28, 30 (LSF1 and LSF2) has occurred. The detection is based especially on the fact that, depending on the installation location of associated sensor 28, 30, each voltage signal has a specific characteristic curve, i.e., voltage curve and voltage level. These generally conventional characteristics are each permanently associated with memory cells 108, 110 (A' and B'), so that an exchange may be detected by a simple comparison of these characteristics.

If an exchange is detected, diagnostic module 112 utilizes a so-called "exchange bit" 114, which indicates the exchange but is not used to set an error message. Instead, with the aid of two changeover switches 116, 118, each triggered by exchange-bit 114, a recopying of the content of memory cell 104 (A) to memory cell 110 (B') and of memory cell 106 (B) to a memory cell 108 (A') is implemented. In this manner, value ushk1' is replaced by ushk2, and value ushk2' by ushk1. As a result, therefore, the correct voltage signals are present again in memory cells 108, 110 (A' and B'), i.e., the voltage signals correctly assigned to memory cells A' and B' based on their voltage characteristic curves.

By utilizing the described switchover it is possible to base the further voltage evaluation and cat diagnosis implemented in a conventional manner in connection with the lambda control on correct values, despite the fact that a permanent exchange of the sensor plugs has occurred.

It should be noted that the circuit illustrated in FIG. 2 may be implemented in an engine control device, such as the "Motronic" developed by the Applicant hereof. A corresponding control program may then be implemented in the form of software realizing the afore-described functionality, or in the form of a hard-wired circuit. Instead of the changeover switches illustrated in FIG. 2, it is possible to use generally conventional electronic switches as an alternative, for instance, transistor switches or electromechanical switches such as relays, etc.

It should also be understood that in principle the present invention may be used as an exchange protection for sensor types other than the afore-described LSF sensors as well, provided these also have an afore-mentioned voltage characteristic curve. In a corresponding manner, it may be used as exchange protection when more than two sensors are involved. Moreover, using the mentioned measuring sensors, the present invention is generally able to be utilized in the field of exhaust-gas aftertreatment as well (in diesel engines, and for lambda measurements in gas engines), so that it is not restricted to the field of motor vehicle technology as described above.

What is claimed is:

1. A method for protecting against an installation exchange of at least two measuring sensors configured to detect at least one of physical and chemical variables of an exhaust gas in a system for exhaust-gas aftertreatment in an internal combustion engine, comprising:
   reading in voltage signals of the at least two measuring sensors;
   digitizing the voltage signals read in in the reading in step;
   buffer-storing voltage values digitized in the digitizing step;
   evaluating the buffer-stored voltage values on a basis of characteristic voltage variables and checking whether an exchange of the at least two measuring sensors has occurred; and
   interchanging the buffer-stored voltage values and buffer-storing the interchanged voltage-values as a function of a result of the checking.

2. The method of claim 1, wherein the internal combustion engine is arranged in a motor vehicle.

3. The method of claim 1, further comprising:
   additionally buffer-storing the buffer-stored, digitized voltage values as a copy;
   evaluating the voltage values buffer-stored as the copy on the basis of the characteristic voltage variables and checking whether an exchange of the at least two measuring sensors has occurred; and
   as a function of the checking, exchanging the buffer-stored voltage values and buffer-storing the buffer-stored voltage values as a copy.

4. The method of claim 1, wherein the voltage values are evaluated in the evaluating step on the basis of a specific characteristic feature of voltage signals corresponding to an installation location of a respective associated measuring sensor.

5. The method of claim 3, wherein the copy is evaluated in the evaluating step on the basis of a specific characteristic feature of the voltage signals corresponding to an installation location of a respective associated measuring sensor.

6. The method of claim 4, wherein the specific characteristic property is in accordance with a voltage curve and a voltage level of the respective measuring sensor.

7. The method of claim 5, wherein the specific characteristic property is in accordance with a voltage curve and a voltage level of the respective measuring sensor.

8. The method of claim 3, wherein the voltage values buffer-stored as a copy are stored in the buffer-storing step in at least two memory cells, specific characteristic features permanently assigned to the at least two memory cells.

9. The method of claim 1, further comprising setting an exchange bit as a function of the result of the checking by which at least two transfer switches are switched over in a cross-wise manner to exchange the plurality of voltage values.

10. A circuit for installation-exchange protection of at least two measuring sensors configured to record at least one of physical and chemical variables of an exhaust gas of a system for exhaust-gas aftertreatment in an internal combustion engine, comprising:
    an arrangement configured to perform a method including the steps of:
      reading in voltage signals of the at least two measuring sensors;
      digitizing the voltage signals read in in the reading in step;
      buffer-storing voltage values digitized in the digitizing step;
      evaluating the buffer-stored voltage values on a basis of characteristic voltage variables and checking whether an exchange of the at least two measuring sensors has occurred; and
      interchanging the buffer-stored voltage values and buffer-storing the interchanged voltage-values as a function of a result of the checking.

11. The circuit of claim 10, wherein the internal combustion engine is arranged in a motor vehicle.

12. The circuit of claim 10, wherein the method further includes:
    additionally buffer-storing the buffer-stored, digitized voltage values as a copy;
    evaluating the voltage values buffer-stored as the copy on the basis of the characteristic voltage variables and checking whether an exchange of the at least two measuring sensors has occurred; and
    as a function of the checking, exchanging the buffer-stored voltage values and buffer-storing the buffer-stored voltage values as a copy.

13. The circuit of claim 10, wherein the voltage values are evaluated in the evaluating step on the basis of a specific characteristic feature of voltage signals corresponding to an installation location of a respective associated measuring sensor.

14. The circuit of claim 12, wherein the copy is evaluated in the evaluating step on the basis of a specific characteristic feature of the voltage signals corresponding to an installation location of a respective associated measuring sensor.

15. The circuit of claim 13, wherein the specific characteristic property is in accordance with a voltage curve and a voltage level of the respective measuring sensor.

16. The circuit of claim 14, wherein the specific characteristic property is in accordance with a voltage curve and a voltage level of the respective measuring sensor.

17. The circuit of claim 12, wherein the voltage values buffer-stored as a copy are stored in the buffer-storing step in at least two memory cells, specific characteristic features permanently assigned to the at least two memory cells.

18. The circuit of claim 10, wherein the method further includes setting an exchange bit as a function of the result of the checking by which at least two transfer switches are switched over in a cross-wise manner to exchange the plurality of voltage values.

19. The circuit of claim 10, further comprising:
    an arrangement configured to read-in voltage signals of the at least two measuring sensors;
    an analog/digital transducer arrangement configured to digitize the voltage signals;
    a memory arrangement configured to buffer-store the digitized voltage values;
    a diagnostic arrangement configured to evaluate the voltage signals stored in the memory arrangement on a basis of characteristic voltage variables and to check whether an exchange of the at least two measuring sensors has occurred; and
    a switching arrangement configured to exchange the voltage values stored in the memory arrangement as a function of the check.

20. The circuit of claim 19, wherein the switching arrangement includes one of an electronic changeover switch, an electromechanical changeover switch, and a control program.

21. The circuit of claim 10, further comprising:
    an arrangement configured to read-in the voltage signals of the at least two measuring sensors;

an analog/digital transducer arrangement configured to digitize the read-in voltage signals;
at least two first memory cells configured to buffer-store the digitized voltage values;
at least two second memory cells configured to buffer-store copies of a content of the at least two first memory cells;
a diagnostic arrangement configured to evaluate the voltage signals stored in the at least two second memory cells on a basis of characteristic voltage variables, to check whether an exchange of the at least two measuring sensors has occurred, and to cause a cross-wise exchange of the voltage values stored in the at least two first memory cells and the at least two second memory cells as a function of the result of the check.

22. The circuit of claim 21, wherein the characteristic voltage variables are permanently assigned to the at least two second memory cells.

23. The circuit of claim 21, further comprising at least two changeover switches connected to the at least two first memory cells and the at least two second memory cells;
wherein the diagnostic arrangement is configured to set an exchange bit in case an exchange is detected, to induce the at least two switchover switches to implement a cross-wise recopying of the contents of the at least two first memory cells to the at least two second memory cells.

24. A control device configured to control a system for exhaust-gas aftertreatment in an internal combustion engine, comprising:
a circuit for installation-exchange protection of at least two measuring sensors configured to record at least one of physical and chemical variables of an exhaust gas, the circuit including:
an arrangement configured to perform a method including the steps of:
reading in voltage signals of the at least two measuring sensors;
digitizing the voltage signals read in in the reading in step;
buffer-storing voltage values digitized in the digitizing step;
evaluating the buffer-stored voltage values on a basis of characteristic voltage variables and checking whether an exchange of the at least two measuring sensors has occurred; and
interchanging the buffer-stored voltage values and buffer-storing the interchanged voltage-values as a function of a result of the checking.

25. The control device of claim 24, wherein the internal combustion engine is arranged in a motor vehicle.

26. The control device of claim 24, wherein the method further includes:
additionally buffer-storing the buffer-stored, digitized voltage values as a copy;
evaluating the voltage values buffer-stored as the copy on the basis of the characteristic voltage variables and checking whether an exchange of the at least two measuring sensors has occurred; and
as a function of the checking, exchanging the buffer-stored voltage values and buffer-storing the buffer-stored voltage values as a copy.

27. The control device of claim 24, wherein the voltage values are evaluated in the evaluating step on the basis of a specific characteristic feature of voltage signals corresponding to an installation location of a respective associated measuring sensor.

28. The control device of claim 26, wherein the copy is evaluated in the evaluating step on the basis of a specific characteristic feature of the voltage signals corresponding to an installation location of a respective associated measuring sensor.

29. The control device of claim 27, wherein the specific characteristic property is in accordance with a voltage curve and a voltage level of the respective measuring sensor.

30. The control device of claim 28, wherein the specific characteristic property is in accordance with a voltage curve and a voltage level of the respective measuring sensor.

31. The control device of claim 26, wherein the voltage values buffer-stored as a copy are stored in the buffer-storing step in at least two memory cells, specific characteristic features permanently assigned to the at least two memory cells.

32. The control device of claim 24, wherein the method further includes setting an exchange bit as a function of the result of the checking by which at least two transfer switches are switched over in a cross-wise manner to exchange the plurality of voltage values.

33. The control device of claim 24, wherein the circuit further includes:
an arrangement configured to read-in voltage signals of the at least two measuring sensors;
an analog/digital transducer arrangement configured to digitize the voltage signals;
a memory arrangement configured to buffer-store the digitized voltage values;
a diagnostic arrangement configured to evaluate the voltage signals stored in the memory arrangement on a basis of characteristic voltage variables and to check whether an exchange of the at least two measuring sensors has occurred; and
a switching arrangement configured to exchange the voltage values stored in the memory arrangement as a function of the check.

34. The control device of claim 33, wherein the switching arrangement includes one of an electronic changeover switch, an electromechanical changeover switch, and a control program.

35. The control device of claim 24, wherein the circuit further includes:
an arrangement configured to read-in the voltage signals of the at least two measuring sensors;
an analog/digital transducer arrangement configured to digitize the read-in voltage signals;
at least two first memory cells configured to buffer-store the digitized voltage values;
at least two second memory cells configured to buffer-store copies of a content of the at least two first memory cells;
a diagnostic arrangement configured to evaluate the voltage signals stored in the at least two second memory cells on a basis of characteristic voltage variables, to check whether an exchange of the at least two measuring sensors has occurred, and to cause a cross-wise exchange of the voltage values stored in the at least two first memory cells and the at least two second memory cells as a function of the result of the check.

36. The control device of claim 35, wherein the characteristic voltage variables are permanently assigned to the at least two second memory cells.

37. The control device of claim 35, wherein the circuit further includes at least two changeover switches connected to the at least two first memory cells and the at least two second memory cells;

wherein the diagnostic arrangement is configured to set an exchange bit in case an exchange is detected, to induce the at least two switchover switches to implement a cross-wise recopying of the contents of the at least two first memory cells to the at least two second memory cells.

* * * * *